US012548707B2

(12) United States Patent
Yen

(10) Patent No.: US 12,548,707 B2

(45) **Date of Patent: *Feb. 10, 2026**

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 1052 days.

This patent is subject to a terminal disclaimer.

(21) Appl. No.: 17/574,564

(22) Filed: Jan. 13, 2022

(65) Prior Publication Data

US 2022/0139608 A1 May 5, 2022

Related U.S. Application Data

(63) Continuation-in-part of application No. 17/014,063, filed on Sep. 8, 2020, now Pat. No. 12,062,480.

(Continued)

(30) Foreign Application Priority Data

Aug. 7, 2020 (TW) ................................ 109126927

(51) Int. Cl.

*H01F 27/28* (2006.01)
*H01F 27/29* (2006.01)
*H01F 27/40* (2006.01)

(52) U.S. Cl.

CPC ......... *H01F 27/2823* (2013.01); *H01F 27/29* (2013.01); *H01F 27/40* (2013.01)

(58) Field of Classification Search

CPC ......... H01F 27/2804; H01F 2027/2809; H01F 17/0013; H01F 17/0006; H01F 5/003;

(Continued)

(56) References Cited

U.S. PATENT DOCUMENTS 10,930,588 B2 2/2021 Raidl
11,095,324 B2 8/2021 Chen et al.

(Continued)

FOREIGN PATENT DOCUMENTS

CN 102483984 A 5/2012
CN 104717833 A 6/2015

(Continued)

OTHER PUBLICATIONS

The office action of the related Chinese application No. 202010748865.1 issued on Nov. 23, 2023.

(Continued)

*Primary Examiner* — Tszfung J Chan

(74) *Attorney, Agent, or Firm* — CKC & Partners Co., LLC

(57) ABSTRACT

An inductor device includes a first trace, a second trace, and a second switch. The first trace includes a first sub-trace, a first switch and a second sub-trace. The first sub-trace includes a first line and a second line. The first switch is configured to switch the first sub-trace to the first line or switch the first sub-trace to the second line. The second sub-trace is coupled to one terminal of the first sub-trace at a first node. The second trace includes a third sub-trace and a fourth sub-trace. The fourth sub-trace is coupled to one terminal of the third sub-trace at a second node. The second switch is coupled to the first node and the second node.

20 Claims, 4 Drawing Sheets

Related U.S. Application Data

(60) Provisional application No. 62/898,618, filed on Sep. 11, 2019.

(58) Field of Classification Search
CPC ........ H01F 27/29; H01F 27/292; H01F 27/40; H01F 2017/0073
USPC .................................................. 336/200, 232
See application file for complete search history.

(56) References Cited

U.S. PATENT DOCUMENTS

| | | | | |
|---|---|---|---|---|
| 11,837,877 | B2 | 12/2023 | Pei et al. | |
| 2007/0268007 | A1 | 11/2007 | El Rai | |
| 2008/0284553 | A1 | 11/2008 | Lim et al. | |
| 2009/0096413 | A1 | 4/2009 | Partovi et al. | |
| 2012/0223796 | A1 | 9/2012 | Huang et al. | |
| 2012/0242406 | A1 | 9/2012 | Ke | |
| 2013/0265132 | A1 | 10/2013 | Huang et al. | |
| 2013/0267185 | A1 | 10/2013 | Chen et al. | |
| 2016/0268039 | A1 | 9/2016 | Park et al. | |
| 2016/0285280 | A1* | 9/2016 | Kallal | H02J 50/10 |
| 2016/0336914 | A1* | 11/2016 | Wang | H03H 5/12 |
| 2018/0254139 | A1 | 9/2018 | Yazaki | |
| 2018/0254313 | A1 | 9/2018 | Huang et al. | |
| 2018/0294089 | A1 | 10/2018 | Leong et al. | |
| 2020/0177151 | A1 | 6/2020 | Pierce et al. | |
| 2021/0074465 | A1 | 3/2021 | Yen et al. | |
| 2021/0074466 | A1 | 3/2021 | Yen et al. | |

FOREIGN PATENT DOCUMENTS

| | | | |
|---|---|---|---|
| CN | 108565102 | A | 9/2018 |
| CN | 110335737 | A | 10/2019 |
| CN | 112335042 | A | 2/2021 |
| CN | 112489921 | A | 3/2021 |
| CN | 112489922 | A | 3/2021 |
| CN | 112687456 | A | 4/2021 |
| TW | 200535878 | A | 11/2005 |
| TW | 201342402 | A | 10/2013 |
| TW | I715516 | B | 1/2021 |

OTHER PUBLICATIONS

The office action of the related Chinese application No. 202010825074.4 issued on Dec. 30, 2021 and its English summary.
The office action of the related Chinese application No. 202111412783.0 dated Jul. 15, 2025.
The office action of corresponding CN application No. 202111192924.2 issued on Jul. 11, 2025 and its English summary.

* cited by examiner

INDUCTOR DEVICE

RELATED APPLICATIONS

This application is a Continuation-in-part of U.S. application Ser. No. 17/014,063, filed on Sep. 8, 2020, which claims priority to the benefit of U.S. Provisional Patent Application No. 62/898,618, filed on Sep. 11, 2019, and Taiwan Application Serial Number 109126927, filed on Aug. 7, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

Radio frequency (RF) devices generates second harmonic, third harmonic, etc. during operation. The harmonics cause negative effect to other circuits. For example, second harmonic of 2.4 GHz circuit is near 5 GHz, and 5 GHz signal causes negative effect to system on chip (SoC).

Conventional way to solve negative effect caused by harmonics is that a filter will be disposed outside of a circuit for filtering the harmonics or improving characteristic of the circuit and the inductor. However, the filter disposed outside of the circuit will affect function of the circuit and generate additional costs.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first trace, a second trace, and a second switch. The first trace includes a first sub-trace, a first switch and a second sub-trace. The first sub-trace includes a first line and a second line. The first switch is configured to switch the first sub-trace to the first line or switch the first sub-trace to the second line. The second sub-trace is coupled to one terminal of the first sub-trace at a first node. The second trace includes a third sub-trace and a fourth sub-trace. The fourth sub-trace is coupled to one terminal of the third sub-trace at a second node. The second switch is coupled to the first node and the second node.

Therefore, based on the technical content of the present disclosure, the capacitor of the inductor device brings a function to filter low frequency, such that low frequency signal induced at the inductor device cannot pass but high frequency signal can pass the capacitor directly. Low frequency signal is, for example, a signal that uses 2.4 GHz as main operating frequency. An induced signal caused by the main operating frequency can be cancelled by the folded inductor of the inductor device. Therefore, the folded inductor will not affect the characteristic of the operating frequency of the inductor. If an inductor which is located at the center of the inductor device has a high frequency signal, for example, a second harmonic (i.e., 5 GHz signal), the high frequency signal may pass the capacitor and form an inductive inductor which is a circle flows through the folded inductor and the capacitor. Therefore, a 5 GHz harmonic signal corresponding to 2.4 GHz signal is induced in the inductor device of the present disclosure. The 5 GHz signal can be used in the circuit. For example, the 5 GHz signal can be amplified and then the amplified 5 GHz signal is used to cancel the 5 GHz harmonic signal of the operating frequency. The amplifying circuit can be arranged by a designer who is familiar with circuit design. As a result, a negative effect to a 5 GHz circuit can be reduced. In addition, since the switch is used as filer, there is a filer disposed inside the inductor device. Therefore, there is no need to dispose a filter outside of the inductor device, so as to prevent an outer filter from affecting the circuit or prevent additional costs.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
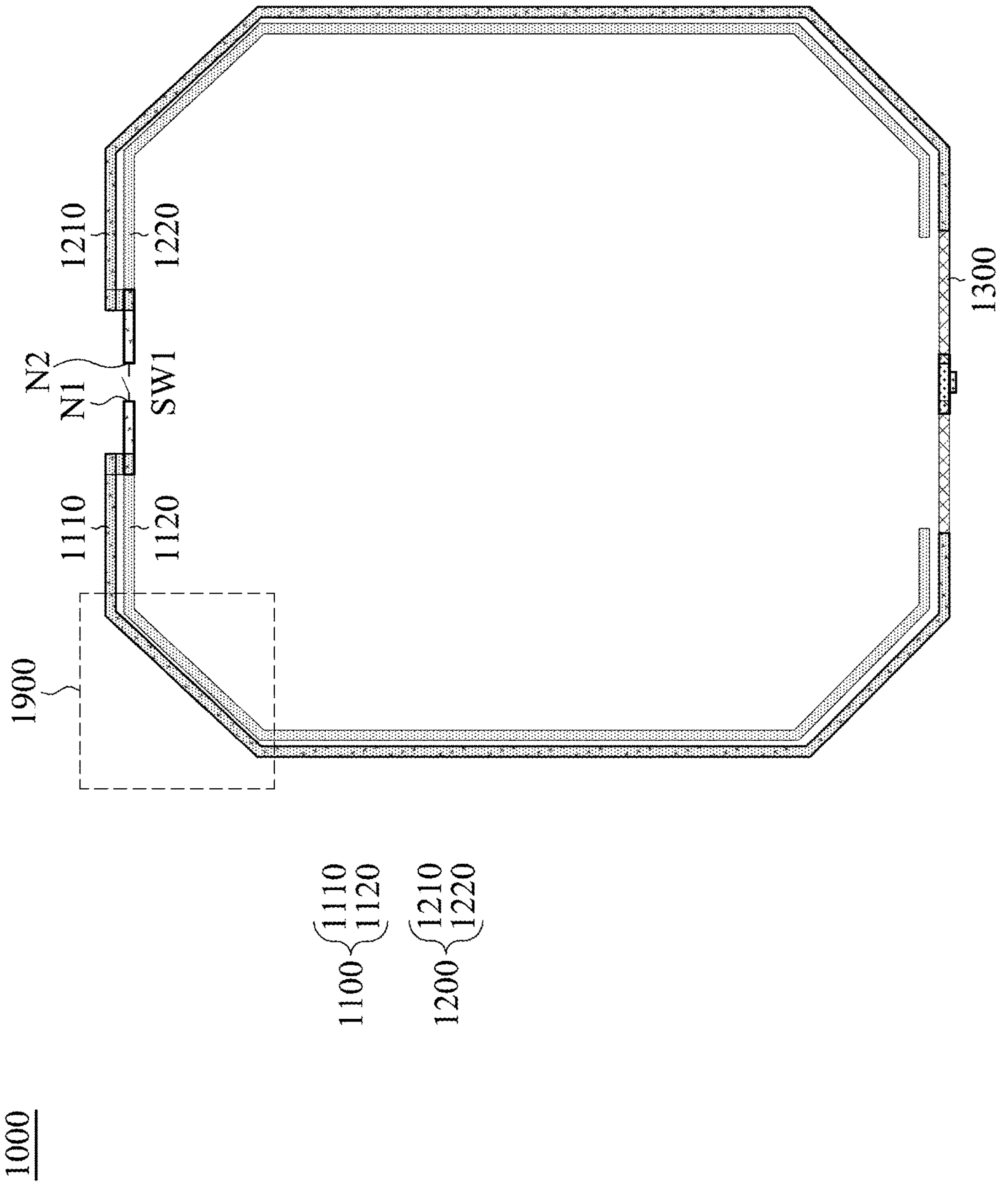
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first trace 1100, a second trace 1200, and a switch SW1. In addition, the first trace 1100 includes a first sub-trace 1110 and a second sub-trace 1120. A terminal of the first sub-trace 1110 and a terminal of the second sub-trace 1120 are coupled at a first node N1. The second trace 1200 includes a third sub-trace 1210 and a fourth sub-trace 1220. A terminal of the third sub-trace 1210 and a terminal of the fourth sub-trace 1220 are coupled at a second node N2. The switch SW1 is coupled between the first node N1 and the second node N2. As shown in the figure, the inductor device 1000 further includes a connection element 1300 coupled between the other terminal of the first sub-trace 1110 and the other terminal of the third sub-trace 1210. With respect to operations, when a low frequency signal is generated, the switch SW1 is turned off, such that the low frequency signal cannot pass through the switch SW1. On the other hand, when a high frequency signal is generated, the switch SW1 is turned on, such that the high frequency signal passes through switch SW1 of the inductor device 1000 to form an induced inductor which is a circle flows through the inductor device 1000. It is noted that, the present disclosure is not limited to the structures as shown in FIG. 1, and it is merely an example for illustrating one of the implements of the present disclosure.

Figure 2:
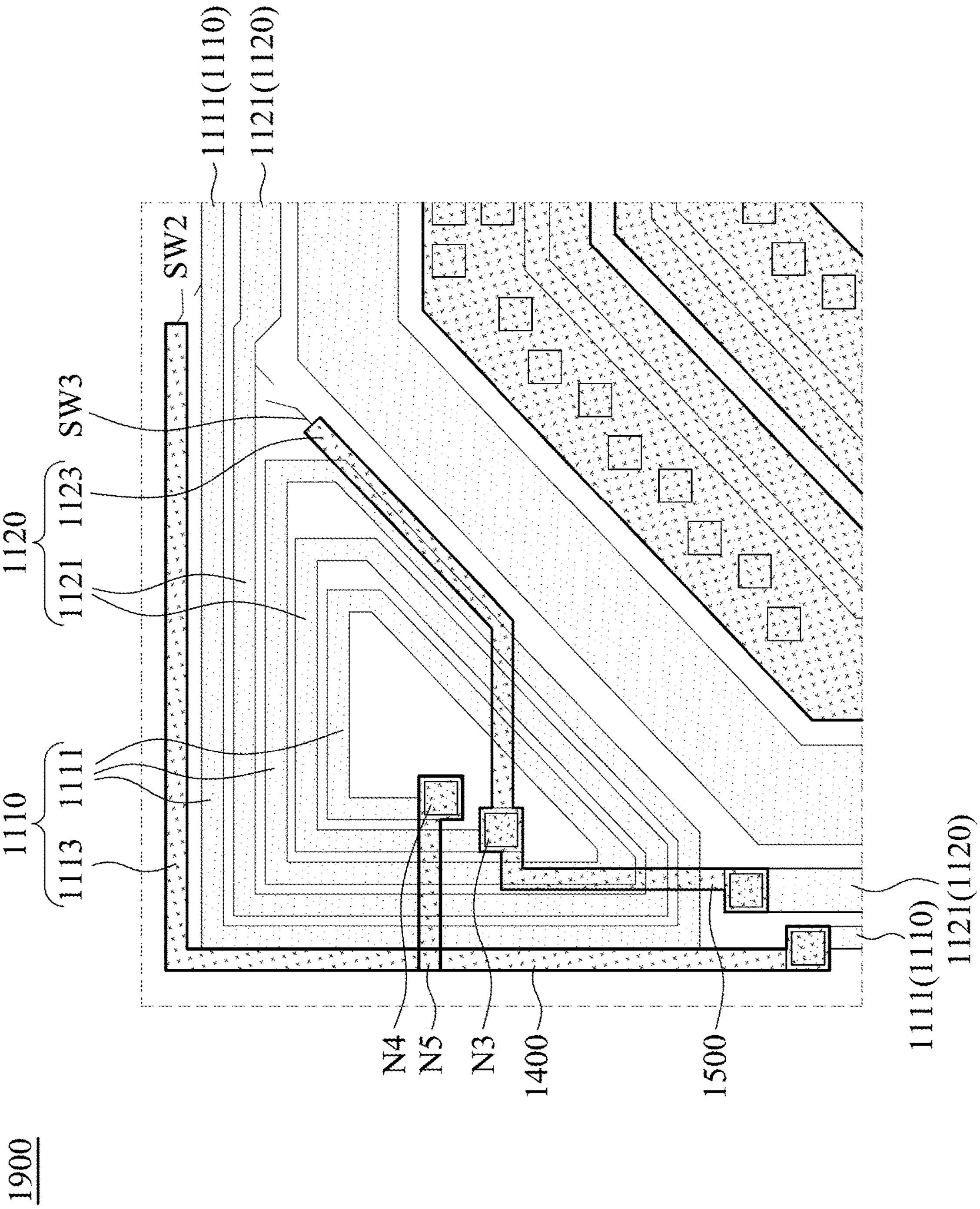
FIG. 2 depicts a schematic diagram of a partial structure of an inductor device shown in FIG. 1 according to one embodiment of the present disclosure.

FIG. 2 depicts a schematic diagram of a partial structure 1900 of the inductor device 1000 shown in FIG. 1 according to one embodiment of the present disclosure. As shown in the figure, the first sub-trace 1110 includes a first line 1111, a second line 1113, and a switch SW2. The switch SW2 is configured to switch the first sub-trace 1110 to the first line 1111, or switch the first sub-trace 1110 to the second line 1113. In one embodiment, the length of the first line 1111 is larger than the length of the second line 1113. Therefore, when the first sub-trace 1110 is switched to the first line 1111, the inductance of the first sub-trace 1110 is larger. In contrast, when the first sub-trace 1110 is switched to the second line 1113, the inductance of the first sub-trace 1110 is smaller.

In one embodiment, the first line 1111 includes a plurality of first wires 1111, and the second line 1113 includes a second wire 1113. Specifically, the first line 1111 is winded to form a plurality of first wires 1111. Besides, the second line 1113 is the second wire 1113 as shown in the figure.

As shown in the figure, the switch SW2 is configured to switch the first sub-trace 1110 to a plurality of first wires 1111, or the switch SW2 is configured to switch the first sub-trace 1110 to the second wire 1113. Therefore, when the switch SW2 is turned off, the signal is transmitted through a plurality of first wires 1111 of the first sub-trace 1110. In contrast, when the switch SW2 is turned on, the signal is transmitted through the second wire 1113 of the first sub-trace 1110. In another embodiment, the plurality of first wires 1111 are located on a first layer, and the second wire 1113 is located on a second layer. In one embodiment, the first layer and the second layer are different layers.

In one embodiment, the second sub-trace 1120 includes a third line 1121, a fourth line 1123, and a switch SW3. The switch SW3 is configured to switch the second sub-trace 1120 to the third line 1121, or switch the second sub-trace 1120 to the fourth line 1123. In one embodiment, the length of the third line 1121 is larger than the length of the fourth line 1123. Therefore, when the second sub-trace 1120 is switched to the third line 1121, the inductance of the second sub-trace 1120 is larger. In contrast, when the second sub-trace 1120 is switched to the fourth line 1123, the inductance of the second sub-trace 1120 is smaller.

In one embodiment, the third line 1121 includes a plurality of third wires 1121, and the fourth line 1123 includes the fourth wire 1123. Specifically, the third line 1121 is winded to form a plurality of third wires 1121. Besides, the fourth line 1123 is the fourth wire 1123 as shown in the figure.

As shown in the figure, the switch SW3 is configured to switch the second sub-trace 1120 to a plurality of third wires 1121, or the switch SW3 is configured to switch the second sub-trace 1120 to the fourth wire 1123. Therefore, when the switch SW3 is turned off, the signal is transmitted through the plurality of third wires 1121 of the second sub-trace 1120. In contrast, when the switch SW3 is turned on, the signal is transmitted through the fourth wire 1123 of the second sub-trace 1120. In another embodiment, the plurality of third wires 1121 are located on the first layer, and the fourth wire 1123 is located on the second layer. In one embodiment, the first layer and the second layer are different layers.

In one embodiment, the fourth wire 1123 and the plurality of first wires 1111 are overlapped to each other partially. In another embodiment, the fourth wire 1123 and the plurality of third wires 1121 are overlapped to each other partially. In still another embodiment, the second wire 1113 is not overlapped to the plurality of first wires 1111 and the plurality of third wires 1121. In one embodiment, the plurality of first wires 1111 and the plurality of the third wires 1121 are disposed to each other in an interlaced manner. For example, the disposition sequence of the plurality of first wires 1111 and the plurality of third wires 1121 can be "the first wire 1111, the third wire 1121, the first wire 1111, the third wire 1121, and the first wire 1111."

Reference is now made to FIG. 1, in one embodiment, the first sub-trace 1110 and the second sub-trace 1120 all include a first terminal and a second terminal. As shown in the figure, the first terminal (e.g. the upper terminal) of the first sub-trace 1110 and the first terminal (e.g. the upper terminal) of the second sub-trace 1120 are coupled at the first node N1. Besides, the third sub-trace 1210 and the fourth sub-trace 1220 all include a first terminal and a second terminal. As shown in the figure, the first terminal (e.g. the upper terminal) of the third sub-trace 1210 and the first terminal (e.g. the upper terminal) of the fourth sub-trace 1220 are coupled at the second node N2.

In one embodiment, the first sub-trace 1110 and the second sub-trace 1120 are disposed at the first side (e.g. the left side of the figure) of the inductor device 1000, and the third sub-trace 1210 and the fourth sub-trace 1220 are disposed at the second side (e.g. the right side of the figure) of the inductor device 1000. In another embodiment, the first side and the second side are located at opposite sides of the inductor device 1000.

Reference is now made to FIG. 2, in one embodiment, the inductor device 1000 further includes a first connection member 1400. The first connection member 1400 includes a first terminal and a second terminal. As shown in the figure, the first terminal (e.g. the upper terminal in the figure) of the first connection member 1400 is coupled to the first line 1111 and the second line 1113 respectively at a node N4 and a node N5. The second terminal (e.g. the lower terminal in the figure) of the first connection member 1400 is coupled to the first line 1111 of the first sub-trace 1110. In another embodiment, the first connection member 1400 is located on the second layer, and the first sub-trace 1110 is located on the first layer.

In one embodiment, the inductor device 1000 further includes a second connection member 1500. The second connection member 1500 includes a first terminal and a second terminal. As shown in the figure, the first terminal (e.g. the upper terminal in the figure) of the second connection member 1500 is coupled to the third line 1121 and the fourth line 1123 at the same point (e.g. the N3 in the figure). The second terminal (e.g. the lower terminal in the figure) of the second connection member 1500 is coupled to the third line 1121 of the second sub-trace 1120. In another embodiment, the second connection member 1500 is located on the second layer, and the second sub-trace 1120 is located on the first layer. It is noted that, although only the partial structure 1900 disposed at the upper-left corner of the inductor device 1000 of the present disclosure is illustrated in FIG. 2, the same partial structure 1900 can be used at the lower-left corner, the upper-right corner, and the lower-right corner of the inductor device 1000, such that different lines can be generated by the switch of the partial structure 1900. Besides, the present disclosure is not limited to the structures as shown in FIG. 2, and it is merely an example for illustrating one of the implements of the present disclosure.

Figure 3:
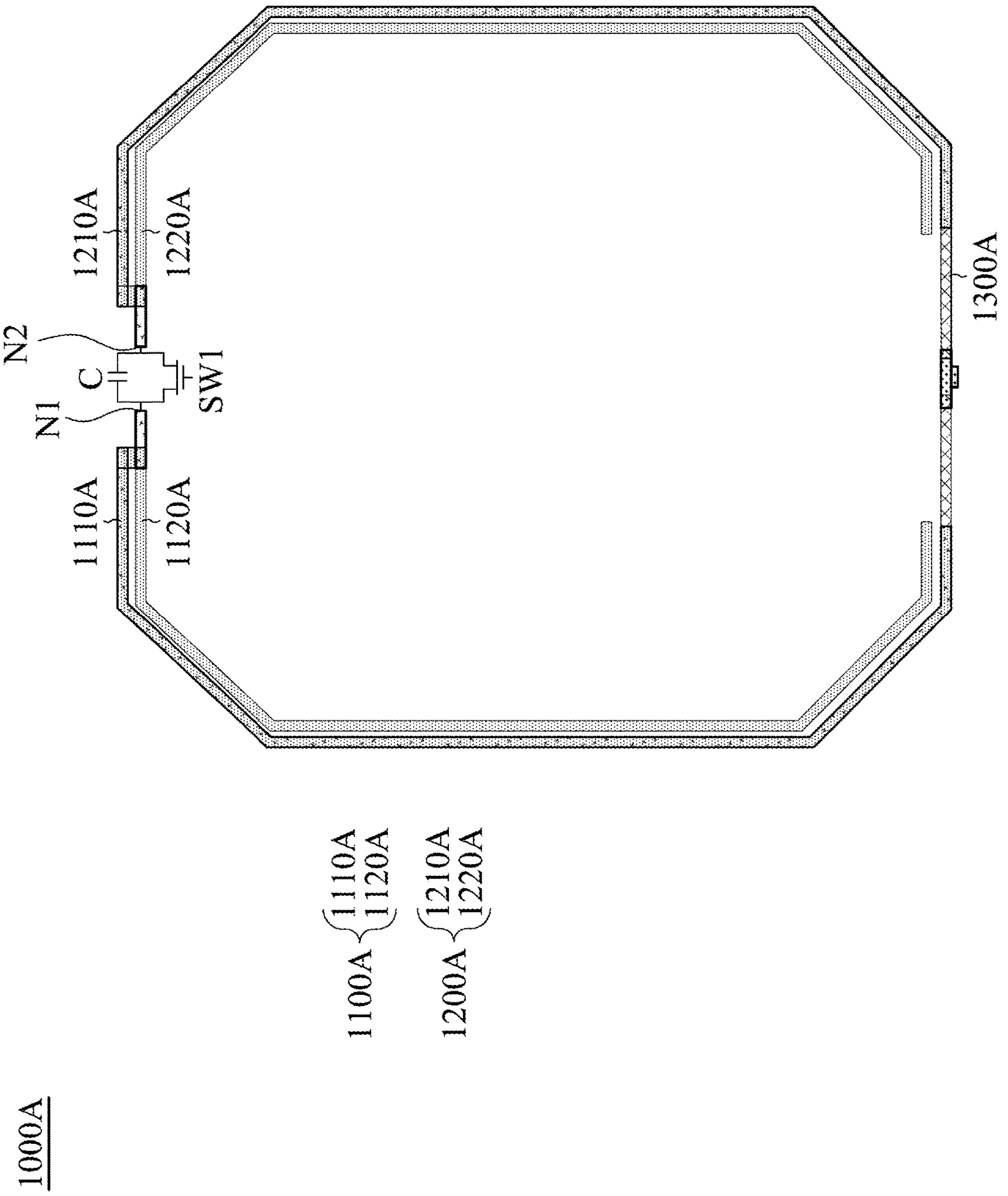
FIG. 3 depicts a schematic diagram of an inductor device according to one embodiment of the present disclosure.

FIG. 3 depicts a schematic diagram of an inductor device 1000A according to one embodiment of the present disclosure. Compared with the inductor device 1000 shown in FIG. 1, the inductor device 1000A shown in FIG. 3 further includes a capacitor C. The capacitor C is coupled between the first node N1 and the second node N2. In one embodiment, the capacitor C and the switch SW1 are disposed to each other in parallel. It is noted that, the element in FIG. 3 (e.g., a first trace 1100A, a second trace 1200A, a first sub-trace 1110A, a second sub-trace 1120A, a third sub-trace 1210A, a fourth sub-trace 1220A, a connection element 1300A), whose symbol is similar to the symbol of the element in FIG. 1, has similar structure feature in connection with the element in FIG. 1. Therefore, a detail description regarding the structure feature of the element in FIG. 3 is omitted herein for the sake of brevity. Besides, the present disclosure is not limited to the structure as shown in FIG. 3, and it is merely an example for illustrating one of the implements of the present disclosure.

Figure 4:
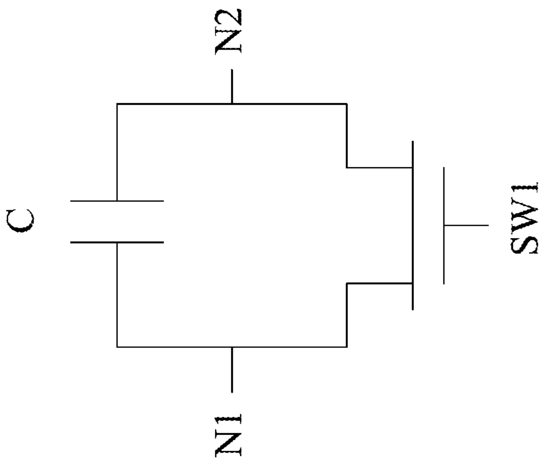
FIG. 4 depicts a schematic diagram of a partial structure of an inductor device shown in FIG. 3 according to one embodiment of the present disclosure.

FIG. 4 depicts a schematic diagram of a partial structure of the inductor 1000A device shown in FIG. 3 according to one embodiment of the present disclosure. As shown in the figure, the capacitor C and the switch SW1 are disposed to each other in parallel at the first terminal point N1 and the second terminal point N2. With respect to operations, when the switch SW1 is turned off, the capacitor C is regarded as a filter for filtering low frequency signal, and let the high frequency signal pass through. It is noted that, the present disclosure is not limited to the structures as shown in FIG. 4, and it is merely an example for illustrating one of the implements of the present disclosure.

It can be understood from the embodiments of the present disclosure that application of the present disclosure has the following advantages. The inductor device of the present disclosure may induce high frequency signal (e.g., second harmonic) of inductor inside the inductor device. After the high frequency signal is amplified by additional circuit, the amplified high frequency signal is able to cancel negative effect to the circuit caused by second harmonic. For example, the capacitor of the inductor device is used to let high frequency signal pass and block low frequency signal. Therefore, the inductor device is able to deal with signals in high frequency or low frequency by two kinds of inducing manner. In addition, since the filter (e.g. the capacitor C) is disposed inside integrated circuit (IC), for example, the inductor device, of the present disclosure, there is no need to dispose a filter outside of the inductor device, so as to prevent an outer filter from affecting the circuit or prevent additional costs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first trace, comprising:

a first sub-trace;

a first switch, configured to connect the first sub-trace to one of a first line and a second line, wherein lengths of the first line and the second line are different, wherein the first sub-trace is connected to the first line when the first switch is turned off, wherein the first sub-trace is connected to the second line when the first switch is turned on; and a second sub-trace, coupled with a terminal of the first sub-trace at a first node;

a second trace, comprising:

a third sub-trace; and a fourth sub-trace, coupled with a terminal of the third sub-trace at a second node; and a second switch, coupled between the first node and the second node.

2. The inductor device of claim 1, wherein the first line comprises a plurality of first wires, and the second line comprises a second wire, wherein the first switch is configured to connect the first sub-trace to the first wires or the second wire, wherein the first sub-trace is connected to the first wires when the first switch is turned off, wherein the first sub-trace is connected to the second wire when the first switch is turned on.

3. The inductor device of claim 2, wherein the first wires are located on a first layer, and the second wire is located on a second layer.

4. The inductor device of claim 3, wherein the second sub-trace, wherein the second trace comprises:

a third switch, configured to connect the second sub-trace to one of the third line and the fourth line, wherein lengths of the third line and the fourth line are different, wherein the second sub-trace us connected to the third line when the third switch is turned off, wherein the second sub-trace is connected to the fourth line when the third switch is turned on.

5. The inductor device of claim 4, wherein the third line comprises a plurality of third wires, and the fourth line comprises a fourth wire, wherein the third switch is configured to connect the second sub-trace to the third wires or the fourth wire, wherein the second sub-trace is connected to the third wires when the third switch is turned off, wherein the second sub-trace is connected to the fourth wire when the third switch is turned on.

6. The inductor device of claim 5, wherein the third wires are located on the first layer, and the fourth wire is located on the second layer.

7. The inductor device of claim 6, wherein the fourth wire and the third wires are overlapped to each other partially.

8. The inductor device of claim 7, wherein the fourth wire and the first wires are overlapped to each other partially.

9. The inductor device of claim 8, wherein the second wire is not overlapped to the first wires and the third wires.

10. The inductor device of claim 9, wherein the first wires and the third wires are disposed to each other in an interlaced manner.

11. The inductor device of claim 1, wherein the first sub-trace comprises:

a first terminal; and a second terminal;

wherein the second sub-trace comprises:

a first terminal; and a second terminal, coupled with the second terminal of the first sub-trace at the first node.

12. The inductor device of claim 11, wherein the third sub-trace comprises:

a first terminal; and a second terminal;

wherein the fourth sub-trace comprises:

a first terminal; and a second terminal, coupled with the second terminal of the third sub-trace at the second node.

13. The inductor device of claim 12, wherein the first sub-trace and the second sub-trace are disposed at a first side of the inductor device, and the third sub-trace and the fourth sub-trace are disposed at a second side of the inductor device.

14. The inductor device of claim 13, wherein the first side and the second side are located at opposite sides of the inductor device.

15. The inductor device of claim 14, further comprising:

a first connection member, comprising:

a first terminal, coupled to the first line and the second line; and a second terminal, coupled to the first sub-trace.

16. The inductor device of claim 15, wherein the first connection member is located on a second layer.

17. The inductor device of claim 16, wherein the second sub-trace comprises a third line and a fourth line, wherein the inductor device further comprises:

a second connection member, comprising:

a first terminal, coupled with the third line and the fourth line at a same point; and a second terminal, coupled to the second sub-trace.

18. The inductor device of claim 17, wherein the second connection member is located on the second layer.

19. The inductor device of claim 18, further comprising:

a capacitor, coupled between the first node and the second node.

20. The inductor device of claim 19, wherein the capacitor and the second switch are coupled to each other in parallel.

* * * * *